United States Patent
Honda et al.

(10) Patent No.: US 6,266,318 B1
(45) Date of Patent: Jul. 24, 2001

(54) CLV-TYPE RECORDABLE OPTICAL DISK AND APPARATUS FOR RECORDING INFORMATION ONTO THE OPTICAL DISK

(75) Inventors: Kazuhiko Honda; Toshihito Uchiyama; Minoru Saito, all of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/546,963

(22) Filed: Apr. 11, 2000

(30) Foreign Application Priority Data

Apr. 15, 1999 (JP) ................................. 11-107358

(51) Int. Cl.$^7$ ..................................... G11B 7/24
(52) U.S. Cl. ..................... 369/275.3; 369/275.4
(58) Field of Search ............... 369/275.3, 275.4, 369/275.2, 47, 48, 32, 58, 54; 386/126

(56) References Cited

U.S. PATENT DOCUMENTS

| | | | |
|---|---|---|---|
| 5,754,522 | * 5/1998 | Kobayashi et al. | 369/275.3 |
| 5,966,368 | * 10/1999 | Kobayashi et al. | 369/275.3 |
| 5,991,257 | * 11/1999 | Kobayashi et al. | 369/275.3 |
| 6,031,816 | * 2/2000 | Inui et al. | 369/275.4 |
| 6,069,869 | * 5/2000 | Nagasawa et al. | 369/275.3 |
| 6,075,761 | * 6/2000 | Akiyama et al. | 369/50 |
| 6,091,700 | * 7/2000 | Kobayashi et al. | 369/275.4 |
| 6,097,695 | * 8/2000 | Kobayashi | 369/275.4 |
| 6,115,353 | * 9/2000 | Horie et al. | 369/275.4 |

* cited by examiner

*Primary Examiner*—Tan Dinh
(74) *Attorney, Agent, or Firm*—Pillsbury Winthrop LLP

(57) ABSTRACT

CLV-type recordable optical disk includes a plurality of tracks which are formed in such a manner that $2\pi Tp/\lambda$ substantially equals an even-number multiple of 0.5 where Tp is a track pitch and $\lambda$ is a wavelength of a track wobble. Each of the tracks is divided into a plurality of ECC blocks, and each of the ECC blocks is composed of 16 sectors. Each of the sectors is composed of 26 sync frames. In each of the sectors of the track, information recording areas are set normally in even-numbered sync frames. However, in each portion where there would occur overlap in the information recording area, in the radial direction of the disk, between the track and an adjoining track located inward of the track, the information recording areas are set in odd-numbered sync frames. One piece of address information is divided into a plurality of address information elements and recorded dispersedly in the sync frames across a plurality of the sectors. With such arrangements, the optical disk can minimize adverse influences that would result from crosstalk between wobble signals from the adjoining tracks.

12 Claims, 10 Drawing Sheets

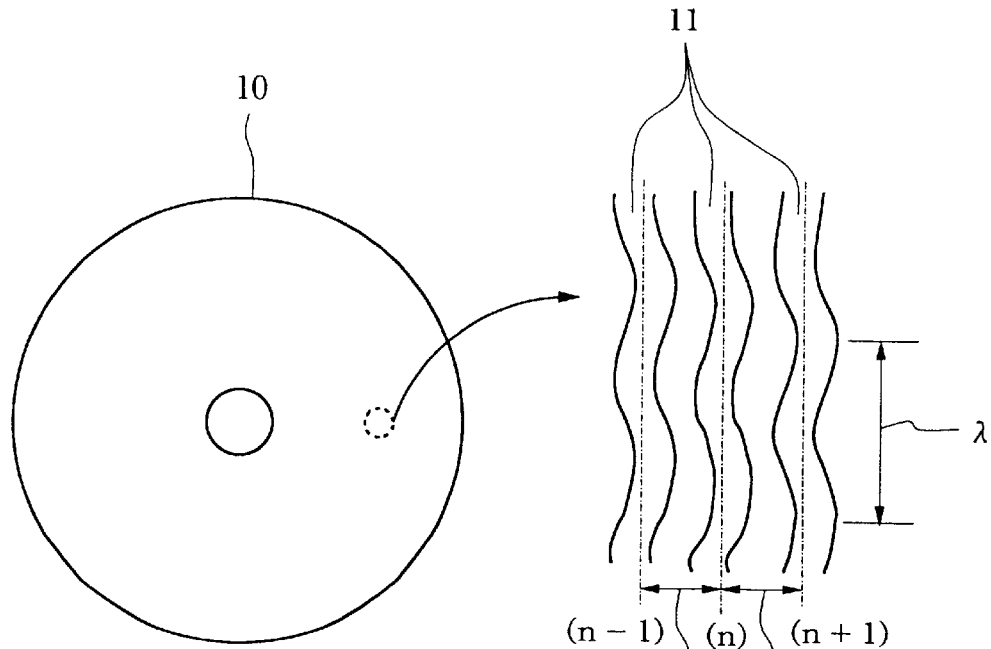
FIG. 1A
FIG. 1B
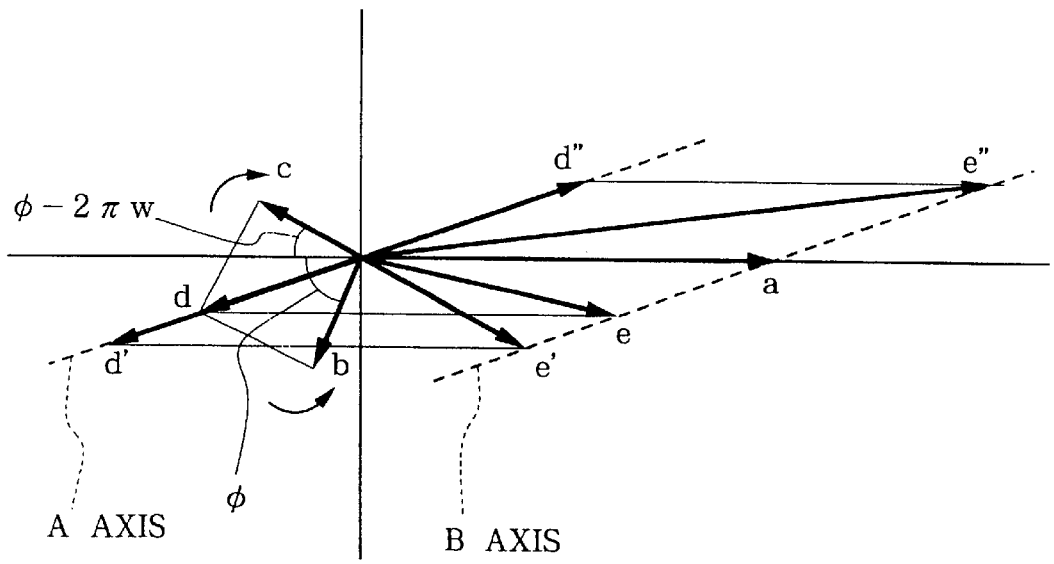
FIG. 2

FIG. 10A WOBBLE SIGNAL (CARRIER WAVE)
FIG. 10B WOBBLE CLOCK
FIG. 10C WOBBLE RECORDING INFO.
FIG. 10D 180°-TWO-PHASE MODULATED SIGNAL

CLV-TYPE RECORDABLE OPTICAL DISK AND APPARATUS FOR RECORDING INFORMATION ONTO THE OPTICAL DISK

BACKGROUND OF THE INVENTION

The present invention relates generally to CLV (Constant Linear Velocity)-type recordable optical disks having track wobbles and apparatus for recording desired information onto such optical disks, and more particularly to a technique of minimizing unwanted cross-talk between wobble signals from adjoining tracks.

In recordable optical disks based on CD standards, such as CD-R (CD-Recordable) and CD-RW (CD-Rewritable) media, a plurality of tracks are previously formed as guide grooves, each of which wobbles typically at a fixed frequency of 22.05 kHz and has recorded thereon address (ATIP: Absolute Time In-Pregroove) information, indicative of absolute positions in the track, in FM-modulated form. The track wobbles are used as detection signals for disk rotation control at the time of recording on the optical disk, and are also used to generate reference clock pulses for the recording. Further, wobble signals detected from the optical disk during the recording are FM-demodulated to acquire the address information.

Further, in DVD-R (Digital Versatile Disk-Recordable) media, tracks are previously formed as grooves each wobbling typically at a fixed frequency of 140 kHz without modulation. Address information is recorded as pre-pits in lands (between the grooves). In this case too, the track wobbles are used as detection signals for disk rotation control at the time of recording on the disk.

In recording desired information onto such optical disks with the track wobbles, however, wobble signals from adjoining tracks tend to be detected as cross-talk signals. Particularly, with high-density optical disks, the cross-talk would occur in a considerably great amount because the track pitch is reduced relative to the size of a light spot irradiated onto the disk. With the CLV (Constant Linear Velocity)-type disks, the wobble signals, detected by the push-pull scheme, would be greatly modulated in both amplitude and phase by the cross-talk signals, resulting in beat signals. Thus, in the case where the address information is recorded in the track wobbles, the phase modulation by the cross-talk causes the address information to jitter, which would prevent accurate data-write linking. These jitters also lead to jitters in the recording reference clock pulses generated from the wobble signals, which would also prevent accurate data-write linking and degrade the quality of recording signals.

SUMMARY OF THE INVENTION

In view of the foregoing, it is an object of the present invention to provide a recordable optical disk and apparatus for recording information onto the optical disk which can minimize influences of cross-talk between wobble signals from adjoining tracks to thereby substantially eliminate phase modulation of the wobble signals.

Explanation is given below about influences of cross-talk between wobble signals from adjoining tracks in recording/reproduction to/or a CLV (Constant Linear Velocity)—type optical disk having track wobbles.

(1) Definition of Variables and Constants:

Principal variables and Constants are defined as follows:

Tp: track pitch;

$\lambda$: wavelength of track wobbles;

$\omega o$: angular frequency of the track wobbles (wobble frequency $fo=2\pi\omega o$)

Tc: time required to trace one round of an nth track;

rn: radial distance of the nth track from the center of the disk when $$t=Tc/2; \quad w=2\pi Tp/\lambda,$$

namely, a difference in the number of wobble waves between adjoining tracks (fraction); and $$\alpha=w\lambda/2\pi rn=Tp/rn$$

(2) Calculation of Relative Angular Frequency of Wobble Waves:

Here, relative angular frequencies of the wobble waves in two tracks adjoining a particular track (nth track) on both sides of the particular track are calculated. First, let's consider a difference in the number of the wobble waves in one complete round between the tracks. Using the number of the wobble waves in one complete round of the nth track, $Wn=2\pi rn/\lambda$, the numbers of the wobble waves in the two adjoining (n+1)th and (n−1)th tracks can be expressed as follows:

$$\text{(n+1)th track: } Wn+w \quad \text{(n−1)th track: } Wn-w$$

Then, respective periods of the wobble waves in the two adjoining (n+1)th and (n−1)th tracks relative to that of the nth track is determined. Because the period of the wobble waves in the nth track can be evaluated by dividing the time required for tracing one complete round of the nth track by the number of the wobble waves, the periods of the wobble waves in the adjoining (n+1)th and (n−1)th tracks can be computed as follows:

$$\text{(n+1)th track: } Tc/(Wn+w) \quad \text{(n−1)th track: } Tc/(Wn-w)$$

Thus, the angular frequencies of the wobble waves in the two adjoining (n+1)th and (n−1)th tracks relative to that of the nth track can be determined as follows, using $\omega o$:

$$\text{(n+1)th track: } 2\pi(Wn+w)/Tc = 2\pi\{1+(Tp/rn)\} fo=(1+\alpha)\omega o$$

$$\text{(n−1)th track: } 2\pi(Wn-w)/Tc = 2\pi\{1+(Tp/rn)\} fo=(1-\alpha)\omega o$$

(3) Calculation of Wobble Waves:

Now that the relative angular frequencies of the wobble waves in the two tracks adjoining the particular track (nth track) on both sides of the particular track have been calculated in the manner mentioned at item (2) above, mathematical expressions indicative of the individual wobble waves are evaluated in the following manner.

If the wobble waves in the nth track (actual wobble waves) is expressed by $$Yn=\cos(\omega o\, t)$$

,then the wobble waves in the (n+1)th and (n−1)th tracks can be expressed as follows:

$$\text{(n+1)th track: } \cos\{(1+\alpha)\omega o\, t+\phi n+1\} \quad \text{(n−1)th track: } \cos\{(1-\alpha)\omega o\, t+\phi n-1\}$$

Note that some relationships based on the following boundary conditions exist between the wobble waves of the nth track and the wobble waves of the (n+1) and (n−1) tracks:

(a) The wobble waves in the nth track and (n+1)th track connect with each other continuously at a time point t (=Tc) of the former, i.e., at a zero time point t (=0) of the latter.

(b) The wobble waves in the nth track and (n−1)th track connect with each other continuously at a zero time point t (=0) of the former, i.e., at a time point t (=Tc) of the latter.

Thus, the following can be given:

*from item (a) above,* $\cos\{(1+\alpha)\,\omega o \cdot 0 + \phi n+1\} = \cos(\omega o\, Tc)$, and

*from item (b) above,* $\cos\{(1-\alpha)\,\omega o\, Tc + \phi n-1\} = \cos(\omega o \cdot 0)$ Solving these give $\phi n+1 = 4\pi^2\, rn/\lambda$, and $\phi n-1 = -(1-\alpha)\, 4\pi^2\, rn/\lambda$ If $\phi = 4\pi^2\, rn/\lambda$, then $\phi n+1$ and $\phi n-1$ can be expressed as follows:

$\phi n+1 = \phi$ $\phi n-1 = -(1-\alpha)\,\phi$

From the foregoing, the wobble waves in the (n+1)th and (n−1)th tracks can be expressed as follows:

(n+1)th track: $\cos\{(1+\alpha)\,\omega o\, t + \phi\}$ (n−1)th track: $\cos\{(1-\alpha)\,\omega o\, t - (1-\alpha)\}$ (4) Push-pull Detection Signal:

If one detection signal output from a four-quadrant photodetector is represented by "A+D" and the other detection signal is represented by "B+C", a tracking error signal can be determined by "(A+D)−(B+C)". Now that the mathematical expressions representing the wobbles of the adjoining tracks relative to those of the nth track have been determined at item (3) above, the push-pull detection signal "(A+D)−(B+C)" relative to the nth track can be determined as follows while taking into account influences of the adjoining tracks:

$(A+D) - (B+C) = \cos(\omega o\, t)$ $-K \cos\{(1+\alpha)\,\omega o\, t + \phi\}$ $-K' \cos\{(1-\alpha)\,\omega o\, t - (1-\alpha)\,\phi\}$ $= \cos(\omega o\, t) - Q(t)$  Expression (a)

$Q(t) = K\cos\{(1+\alpha)\,\omega o\, t + \phi\} + K'\cos\{(1-\alpha)\,\omega o\, t - (1-\alpha)\,\phi\}$ Here, K and K' are constants indicative of degree of influences exerted on the nth track by the adjoining (n+1)th and (n−1)th tracks. Assuming that the adjoining (n+1)th and (n−1)th tracks both exert the same degree of influences on the nth track, K and K' can be considered to be equal to each other (K=K'), in which case Q (t) can be modified as follows:

$Q(t) = K\,[\cos\{(1+\alpha)\,\omega o\, t + \phi\}$ $+\cos\{(1-\alpha)\,\omega o\, t - (1-\alpha)\,\phi\}]$ $= K\,[\cos\{(1+\alpha)\,\phi o\, t\}\,\cos(\phi)$ $-\sin\{(1+\alpha)\,\omega o\, t\}\,\sin(\phi)$ $+\cos\{(1-\alpha)\,\omega o\, t\}\,\cos\{(1-\alpha)\,\phi\}$ $+\sin\{(1-\alpha)\,\omega o\, t\}\,\sin\{(1-\alpha)\,\phi\}$ $= K\,[\{\cos(\omega o\, t)\,\cos(\alpha\omega o\, t)$ $-\sin(\omega o\, t)\,\sin(\alpha\omega o\, t)\}\,\cos(\phi)$ $-\{\sin(\omega o\, t)\,\cos(\alpha\omega o\, t)$ $+\cos(\omega o\, t)\,\sin(\alpha\omega o\, t)\}\,\sin(\phi)$ $+\{\cos(\omega o\, t)\,\cos(\alpha\omega o\, t)$ $+\sin(\omega o\, t)\,\sin(\alpha\omega o\, t)\}$ $\{\cos(\phi)\,\cos(\alpha\phi) + \sin(\phi)\,\sin(\alpha\phi)\}$ $+\{\sin(\omega o\, t)\,\cos(\alpha\omega o\, t)$ $-\cos(\omega o\, t)\,\sin(\alpha\omega o\, t)\}$ $\{\sin(\phi)\,\cos(\alpha\phi) - \cos(\phi)\,\sin(\alpha\phi)\}]$  Expression (b)

Vector diagram of the push-pull detection signal based on Expression (a) and Expression (b) above is generally as illustrated in FIG. 2, where various reference characters are defined as follows:

a: vector of the wobble signal of the nth track (which is used as a reference vector in the example of FIG. 2).

b: vector of cross-talk by the wobble signal of the (n+1)th track, where the vector has a magnitude K and rotates in a counterclockwise direction at an angular frequency of $\alpha\omega o$, and the phase at the zero time point t (=0) is $\pi+\phi$.

c: vector of cross-talk by the wobble signal of the (n−1)th track, where the vector has a magnitude K and rotates in a clockwise direction at an angular frequency of $\alpha\omega o$, and the phase at the zero time point t (=0) is $\pi-(\phi-2\pi w)$.

d: a composite vector of the above-mentioned vectors b and c (which stretches and contracts along an A axis).

d' and d": maximum values of the composite vector d.

e: a composite vector of the above-mentioned vectors a and d.

e': a composite vector of the above-mentioned vectors a and d'.

e": a composite vector of the above-mentioned vectors a and d".

The wobble signal detected here has the composite vector e of the vectors a and d, and the tip of the vector e moves between e' and e" along an axis parallel to the A axis. Therefore, the detected wobble signal would vary, in both phase and amplitude, due to cross-talk between wobble signals from the adjoining (n+1)th and (n−1)th tracks.

(5) Variation in the Push-pull Detection Signal "(A+D)−(B+C)" Depending on a Condition of w:

At item (4) above, a general formula representative of the push-pull detection signal "(A+D)−(B+C)" has been determined as Expression (a) and Expression (b).

Here, let's consider the push-pull detection signal "(A+D)−(B+C)" when the value w is an even-number multiple of 0.5, namely, w=0.5×2n (n is a natural number). When w=0.5×2n, $\alpha\phi$ can be expressed as $\alpha\phi = (w\lambda/2\pi rn)\cdot(4\pi^2 rn/\lambda) = 2\pi w = 2n\pi$ Thus, $\sin(\alpha\phi)$ and $\cos(\alpha\phi)$ in the third and fourth terms of Expression (b) become "0" and "1", respectively, namely, $\sin(\alpha\phi) = 0$, and $\cos(\alpha\phi) = 1$ Accordingly, Expression (b) is modified as $Q(t) = 2K\cos(\alpha\omega o\, t+\phi) \cos(\omega o\, t)$ At that time, the push-pull detection signal "(A+D)−(B+C)" can be expressed as follows on the basis of Expression (a):

$(A+D)−(B+C) = \cos(\omega o\, t) − 2K\cos(\alpha\omega o\, t+\phi) \cos(\omega o\, t)$
$= \{1 − 2K\cos(\alpha\omega o\, t+\phi)\} \cos(\omega o\, t)$    Expression (c)

FIG. 3 is a vector diagram of the push-pull detection signal based on Equation (c) above, where reference characters used have the same meanings as explained earlier in relation to FIG. 2. In FIG. 3, the vector d stretches and contracts along a real-number axis, so that the vector e of the wobble signal, detected as the composite vector of the vectors a and d, moves between e' and e" along the real-number axis. Solid lines in FIG. 4 show a waveform of the thus-detected wobble signal, which is modulated only in amplitude as compared to when there is no cross-talk (dotted lines), but not modulated in phase at all (i.e., its zero-cross points have not been shifted at all). As a result, the present invention can provide accurate position information free of jitters and also can generate recording reference clock pulses with no fluctuation.

The present invention is based on the above-discussed principles. Namely, the present invention provides a CLV-type recordable optical disk including a plurality of tracks, in which the tracks are formed in such a manner that $2\pi Tp/\lambda$ substantially equals an even-number multiple of 0.5 where Tp is a track pitch and $\lambda$ is a wavelength of a track wobble. Each of the tracks is divided into a plurality of address sections each including a first predetermined number of wobble waves, and each of the address sections is divided into a plurality of small-size sections each including a second predetermined number of the wobble waves. Information recording area having a length smaller than a half of the length of the small-size section is set, for each of the tracks, in each particular one of the small-size sections of the track located where there occurs no overlap in the information recording area, in a radial direction of the optical disk, between the track and other tracks adjoining the track. One piece of address information for each of the address sections is divided into a plurality of address information elements that are allotted to respective ones of the information recording areas within the address section. Further, the track wobble at a predetermined position within each of the information recording areas having the address information elements allotted thereto is recorded with 180°-two-phase modulation performed thereon in accordance with the allotted address information, and the track wobbles in other areas than the information recording areas are recorded in non-modulated form.

The present invention further provides a CLV-type recordable optical disk including a plurality of tracks, in which the tracks are formed in such a manner that $2\pi Tp/\lambda$ substantially equals an even-number multiple of 0.5 where Tp is a track pitch and $\lambda$ is a wavelength of a track wobble, and each of the tracks is divided into a plurality of address sections each including a first predetermined number of wobble waves, each of the address sections being divided into a plurality of medium-size sections each including a second predetermined number of the wobble waves, each of the medium-size sections being divided into a plurality of small-size sections each including a third predetermined number of the wobble waves. Information recording area having a length smaller than a half of the length of the small-size section is set, for each of the tracks, in each particular one of the small-size sections located where there occurs no overlap in the information recording area, in a radial direction of the optical disk, between the track and other tracks adjoining the track, and a leading-information-recording-area syncronization signal is allotted to a leading one of the information recording areas in each of the medium-size sections, to identify the leading information recording area in the medium-size section. One piece of address information for each of the address sections is divided into a plurality of address information elements, which are allotted to the respective information recording areas within the address section, other than the leading information recording area, where the leading-information-recording-area syncronization signal is not allotted (i.e., non-leading information recording areas). The track wobble at a predetermined position in the leading information recording area of each of the medium-size sections where the leading-information-recording-area syncronization signal is allotted is recorded with 180°-two-phase modulation performed thereon in accordance with the allotted leading-information-recording-area syncronization signal, the track wobble at a predetermined position in each of the other information recording areas where the address information elements are allotted is recorded with 180°-two-phase modulation performed thereon in accordance with the allotted address information element, and the track wobbles in remaining areas are recorded in non-modulated form.

According to the recordable optical disk of the present invention, an unwanted phase variation of the detected wobble signal from a given track can be minimized, although the detected wobble signal of the given track may vary in amplitude due to cross-talk by the wobble signals from adjoining tracks located on both sides of the given track. Therefore, when reference clock pulses are to be generated on the basis of the detected wobble signal, they can be generated in a stabilized condition without involving any significant phase variation. Further, the present invention can detect the address information recorded in the track wobble without the phase variation, so that it achieves accurate data-write linking and improved quality of recording signals.

In a preferred implementation of the present invention, the information recording area is set primarily in every other small-size section of each of the tracks, and in each portion of the optical disk where there would occur overlap in the information recording area, in the radial direction of the optical disk, between the currently-traced track and other tracks adjoining the track, the information recording areas of the tracks are displaced in position from each other by the length of one small-size section to thereby avoid the overlap.

In another preferred implementation, the information recording area is set primarily in every other small-size section of each of the tracks, and in each portion of the optical disk where there would occur overlap in the information recording area, in the radial direction of the optical disk, between the track and other tracks adjoining the track, the information recording areas of the tracks are displaced in position from each other by the length of one small-size section to thereby avoid the overlap. Further, the information recording area is set only in each of even-numbered small-size sections or in each of odd-numbered small-size sections within each of the medium-size sections, and an even-number/odd-number identifying signal is allotted to the leading information recording area in each of the medium-size sections in order to indicate whether the information recording area is set only in each of the even-numbered small-size sections or in each of the odd-numbered small-size sections within each of the medium-size sections. In this case, the track wobble at a predetermined position within each of the information recording areas is recorded with 180°-two-phase modulation performed thereon in accordance with the allotted even-number/odd-number identifying signal.

The information recording area may be set, for example, in the start position of the small-size section, and an information recording area synchronization signal produced by recording the track wobble successively for a predetermined period in non-modulated and 180°-inverted form may be recorded at the head of the information recording area.

Further, the present invention may be arranged in such a manner that each of the small-size sections corresponds to a sync frame in a DVD standard and a total number of the wobble waves within the sync frame is set to 42. In this case, the sync frame and the track wobble may be synchronous in phase with each other so that the track wobble is set to a 0° phase at a start point of the sync frame.

According to another aspect of the present invention, there is provided an optical disk recording apparatus which is directed to recording desired information onto any one of the improved CLV-type recordable optical disk as discussed above. The optical disk recording apparatus of the present invention comprises: a 180°-two-phase demodulation circuit that performs 180°-two-phase demodulation on a wobble signal detected from the optical disk to thereby demodulate information recorded in the information recording areas; an address information demodulation circuit that, on the basis of the information demodulated by the 180°-two-phase demodulation circuit, demodulates the address information recorded dispersedly in the small-size sections of each of the address sections; and a recording position control circuit that performs recording position control on the basis of the address information demodulated by the address information demodulation circuit.

According to still another aspect of the present invention, there is provided a CLV-type recordable optical disk including a plurality of tracks, where the tracks are formed in such a manner that $2\pi Tp/\lambda$ substantially equals an even-number multiple of 0.5 where Tp is a track pitch and $\lambda$ is a wavelength of a track wobble, and each of the tracks is divided into a plurality of address sections, a predetermined number of wobble waves in the track constituting an address section, the address section being divided into a plurality of small-size sections. One piece of address information to be recorded for each of the address sections of the track is divided into a plurality of address information elements that are allotted to respective ones of the small-size sections within the address section located in a position where there occurs no overlap in the information recording area, in a radial direction of the optical disk, between the track and other tracks adjoining the particular track. Further, the track wobble in each of the small-size sections to which the address information element is allotted is recorded with 180°-two-phase modulation performed thereon in accordance with the allotted address information element and the track wobble in the other small-size sections are recorded in non-modulated form.

In the recordable optical disk according to the other aspect of the present invention, the information recording areas where the address information elements are allotted may be each set to any other length than half the length of the small-size section; for example, such an information recording area may be set over the entire length of the small-size section. Further, the information recording area may be set in every three (or more) small-size sections. In this case too, in each portion of the optical disk where there would occur overlap in the information recording area, in the radial direction of the optical disk, between the currently-traced track and other tracks adjoining the track, the information recording areas of the tracks may be displaced in position from each other by the length of one small-size section to thereby avoid the overlap. With such arrangements, an unwanted phase variation of the detected wobble signal from a given track can be minimized, although the detected wobble signal of the given track may vary in amplitude due to cross-talk by the wobble signals from adjoining tracks located on both sides of the given track. Therefore, when reference clock pulses are to be generated on the basis of the detected wobble signal, they can be generated in a stabilized condition without involving any significant phase variation. Further, the present invention can detect the address information recorded in the track wobble without the phase variation, so that it achieves accurate data-write linking and improved quality of recording signals.

BRIEF DESCRIPTION OF THE DRAWINGS

For better understanding of the object and other features of the present invention, its preferred embodiments will be described hereinbelow in greater detail with reference to the accompanying drawings, in which:

FIGS. 1(a) and 1(b) are views showing an optical disk in accordance with an embodiment of the present invention;

FIG. 2 is a vector diagram of an ordinary push-pull detection signal generated during recording/reproduction on a CLV disk having track wobbles;

DETAILED DESCRIPTION OF THE PREFERRED EMBODIMENTS

Figure 3:
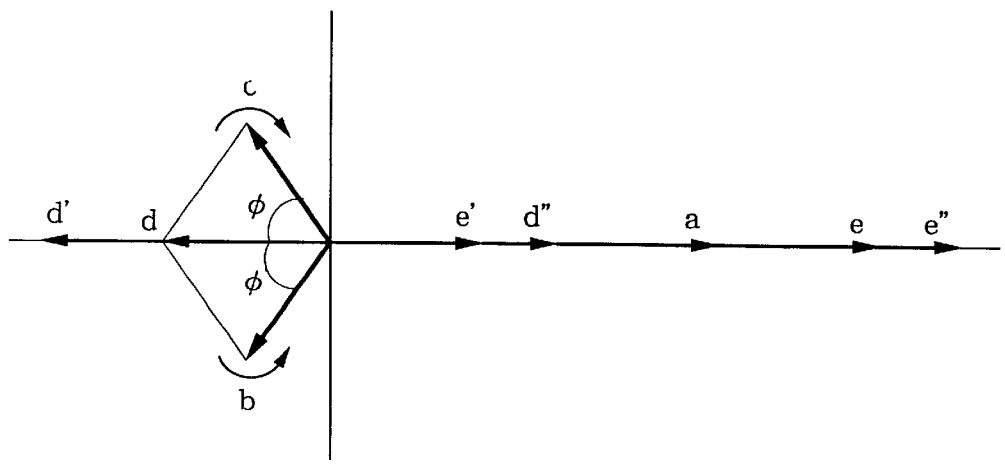
FIG. 3 is a vector diagram of an ordinary push-pull detection signal generated when $2\pi Tp/\lambda$ is set to an even-number multiple of 0.5.

FIGS. 1(a) and 1(b) are views showing an optical disk 10 in accordance with a preferred embodiment of the present invention, which is a recordable (write-once or rewritable) optical disk of the CLV (Constant Linear Velocity) type. As shown in an enlarged scale in part (b) of FIG. 1(b), the optical disk 10 has a plurality of tracks in the form of grooves 11 formed in its recording surface, which wobble at a predetermined frequency (e.g., 140 kHz); the pitch Tp between every adjoining tracks is set to be constant. Further, a wavelength $\lambda$ of the track wobbles and the track pitch Tp are set to the following relationship:

$$2\pi Tp/\lambda = (2n+2)/2 \ (n=0, 1, 2, \ldots)$$

Namely, the wavelength $\lambda$ of the track wobbles and the track pitch Tp in the embodiment are set such that $2\pi Tp/\lambda$ becomes an even number multiple of 0.5. In each of the track wobbles, there is recorded wobble recording information that is obtained by modulating the wobble in accordance with a 180°-two-phase modulation scheme and includes address information indicative of absolute positions on the optical disk 10.

The following paragraphs describe an exemplary format in which the wobble recording information is recorded in the track wobble. As shown in FIG. 5A, each of the tracks (grooves 11) of the optical disks 10 is divided into a plurality of ECC (Error-Correction Code) blocks. Each of the ECC blocks is a minimum unit with which is performed information recording based on pit formation. In reproduction, error correction can be made by reading out the wobble recording information on a block-by-block basis. Each of the ECC blocks can also be set as a minimum unit of address information (ADIP: Address In Pre-groove) to be recorded in the track wobble; that is, each of the ECC blocks can be set as an address section.

As shown in FIG. 5B, each of the ECC blocks is made up of a predetermined number of (16 in the illustrated example) sectors (medium-size sections). As shown in FIG. 5C, each of the sectors is made up of a predetermined number of (26 in the illustrated example) sync frames (small-size sections). In each of the sectors, information recording areas are set in the even-numbered sync frames ($0^{th}$, $2^{nd}$, $4^{th}$, ..., $24^{th}$ sync frames, namely, sync frames in odd-numbered places as counted from the start point of the sector) or set in the odd-numbered sync frames ($1^{st}$, $3^{rd}$, $5^{th}$, ..., $25^{th}$ sync frames, i.e., sync frames in even-numbered places as counted from the start point of the sector). Each piece of the address information is divided into a plurality of address information elements and recorded dispersedly into the information recording areas of the sync frames across the plurality of sectors.

FIG. 5D shows an exemplary organization of the sync frame, where the information recording area is set as a portion of a predetermined length extending from the beginning of the sync frame to a position slightly displaced off the middle of the sync frame toward the beginning. In the information recording area, there are recorded the address information elements and other information, as wobble recording information, obtained by modulating the wobble with the 180°-two-phase modulation scheme according to the information. Further, in another area than the information recording area of the sync frame (or in an entire area of the sync frames having no such information recording area), the wobble is recorded without modulation, i.e., in non-modulated form. Note that predetermined synchronization data is imparted to the start point of each of the sync frames to identify the sync frame start point while other synchronization data is imparted to the start point of each of the sectors to identify the sector start point. Further, each of the ECC blocks can be identified by a kind of address information called "ID" information provided in each of the sectors constituting that ECC block.

In the case where the wobble is recorded with 180°-two-phase modulation performed thereon according to the wobble recording information, the relationship of "$2\pi Tp/\lambda$" would be lost in a region where one of two particular tracks n−1 and n+1 immediately preceding and following a currently-traced track n is inverted while the other is non-inverted. In such a region, detected wobble signals would be modulated in phase by the wobbles of the two tracks n−1 and n+1 adjoining the current track n. To avoid the undesired phase modulation, it is only necessary to prevent the information recording areas from overlapping between the adjoining tracks in the radial direction of the optical disk. Thus, in the preferred embodiment, each of the information recording areas is set to a length smaller than half the length of the sync frame, and such information recording areas are provided only in the even-numbered sync frames (namely, one information recording area is established in every other sync frame), as an essential feature of the present invention. Additionally, the preferred embodiment is arranged in such a manner that in each sector whose information recording area overlaps, in the disk's radial direction, at least partly that of an inner adjoining track, the information recording area is displaced rearward so as to be set in the following odd-numbered sync frame.

Figure 6:
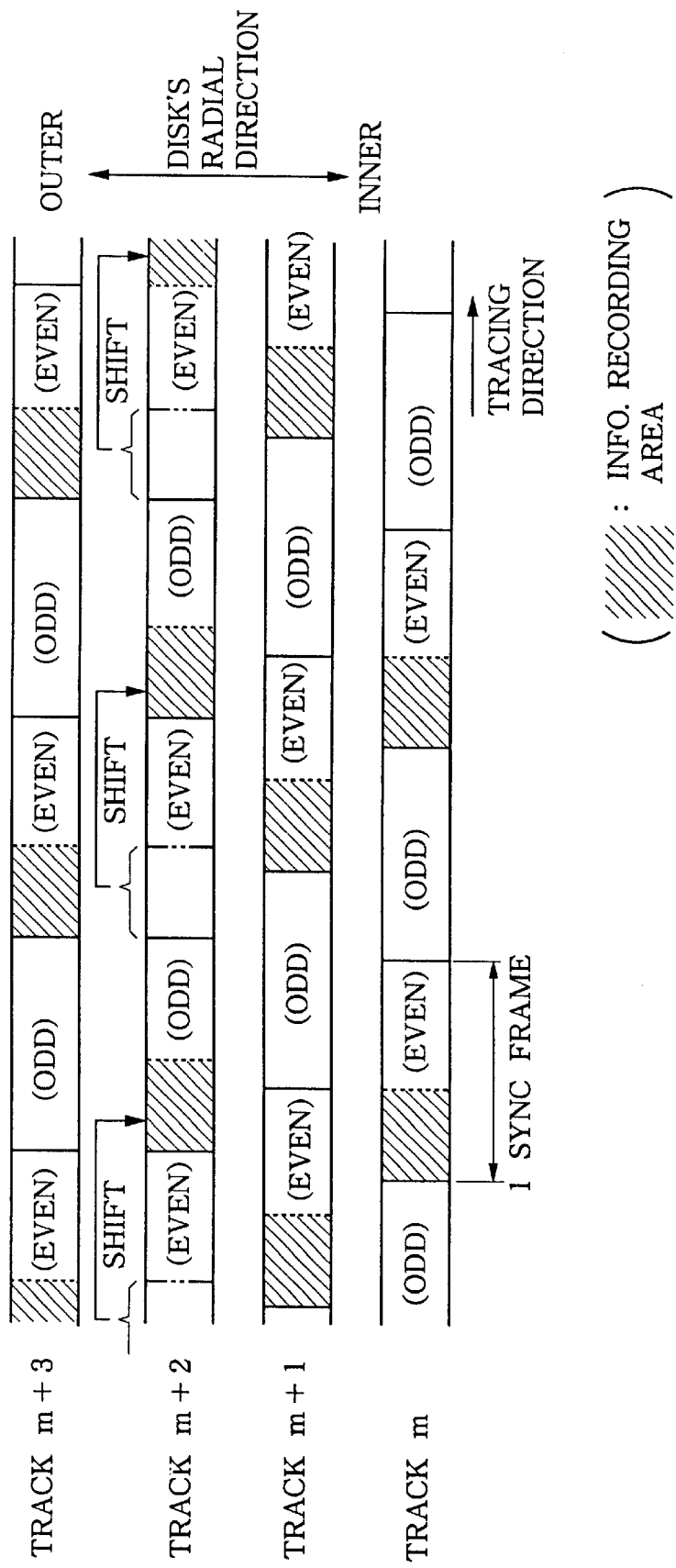
FIG. 6 is a diagram showing an exemplary manner in which information recording areas are set in a plurality of adjoining tracks located in a given portion of the optical disk of FIG. 1.

In FIG. 6, there is shown an exemplary manner in which the information recording areas are set in a plurality of adjoining tracks on the optical disk 10; illustration of the waves of the wobble is omitted for simplicity and each of the information recording areas is shown by hatching. Let's also assume that there are no boundaries between the sectors in the illustrated range. The information recording areas of a given track m do not overlap those of an adjoining track (m−1: not shown) located inwardly the track m, and are set in its even-numbered sync frames. Similarly, the information recording areas of a next track m+1 do not overlap those of the track m adjoining and located inwardly of the track m+1, and are set in its even-numbered sync frames. In each of the even-numbered sync frames of another track m+2 where there would occur an overlap between the information recording areas of the tracks m+2 and the inner adjoining track m+1, the information recording area of the track m+2 is shifted rearwardly, by a distance corresponding to the length of one sync frame, to be set in the odd-numbered sync frame immediately following that even-numbered sync frame. In another track m+3, there would occur no overlap between the information recording areas of the tracks m+3 and the inner adjoining track m+2, so that the information recording area is set in each of its even-numbered sync frames.

FIGS. 7(a)–7(d) are diagrams, each showing an exemplary manner in which the track wobble in the information recording area is recorded on the optical disk in accordance with the DVD standard, where track pitch Tp=0.741 $\mu$m one sync frame=1488 channel bits one channel bit length=0.133 $\mu$m Circumferential length of one round of each track can be represented by "$2\pi Tp/\lambda$", and if a wavelength $\lambda$ of the track wobbles is chosen such that it equals the circumferential length of one track round, then $2\pi Tp/\lambda = 1$
, which satisfies the condition that "$2\pi Tp/\lambda$" be an even number multiple of 0.5. Thus, the wobble signal to be reproduced becomes quite unsusceptible to phase modulation by cross-talk between adjoining tracks, at which time $\lambda = 4.649$ μm.

On the other hand, one sync frame length is $$1488 \times 0.133 = 197.904 \text{ μm}$$

Therefore, when $\lambda = 4.649$ μm, the number of the wobble waves within one sync frame is $$197.904/4.649 = 42.569 \text{ waves}$$

However, because the number of the wobble waves within one sync frame must be an integer and have a submultiple, "43" is selected as an integer close to 42.569. If the number of the wobble waves within one sync frame is set to "42", then the wavelength $\lambda$ of the track wobbles becomes 4.7121 μm because $197.904/\lambda = 42$. At that time, $2\pi Tp/\lambda = 0.987$
, which substantially satisfies "$2\pi Tp/\lambda$" be an even number multiple of 0.5, so that the reproduced wobble signal can almost be prevented from being phase-modulated by cross-talk between adjoining tracks.

In the illustrated example of FIGS. 7(a)–7(d), each of the sync frame contains 42 wobble waves. The track wobble is synchronous in phase with the sync frame and has a 0° phase at the start point of the sync frame. Divisor of the wobble waves within the sync frame is set as a minimum wave inversion period, so that the wobble phase at each wave inversion point is 0°. In the example of FIGS. 7(a)–7(d), the minimum wave inversion period is set to equal three waves and represented by "w-bit"; that is, one sync frame = 42 wobble waves = 14 w-bits The information recording area is provided over a range of 6 w-bits from the start point of the sync frame to a point before the middle of the sync frame; namely, the information recording area has a length smaller than half the length of the sync frame. In the remaining 8 w-bits, the track wobble is recorded in non-modulated form.

Figure 7:
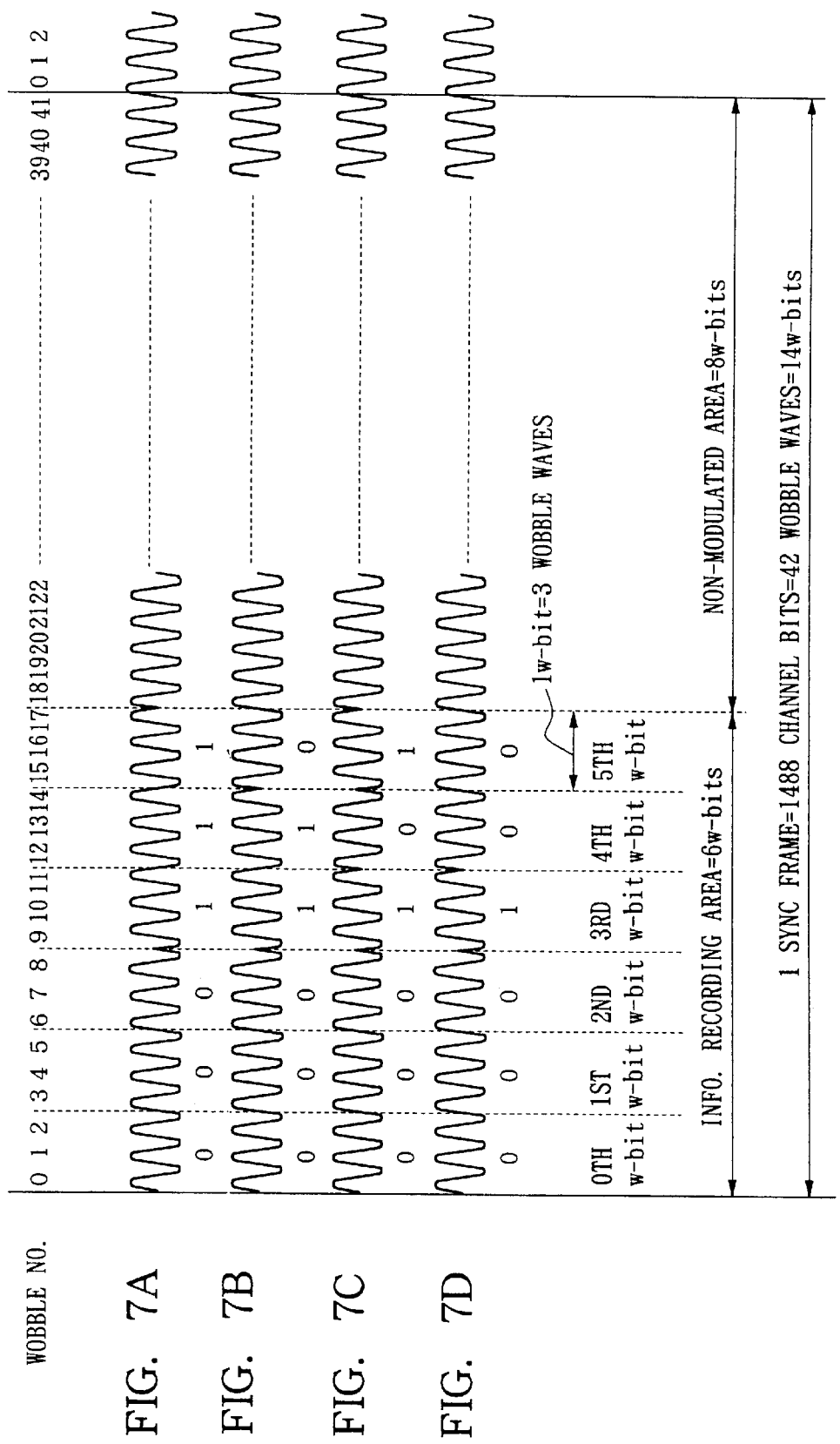
FIGS. 7(a)–7(d) are diagrams, each showing an exemplary manner in which the track wobble is recorded in the information recording area of the optical disk of FIG. 1.
Figure 8:
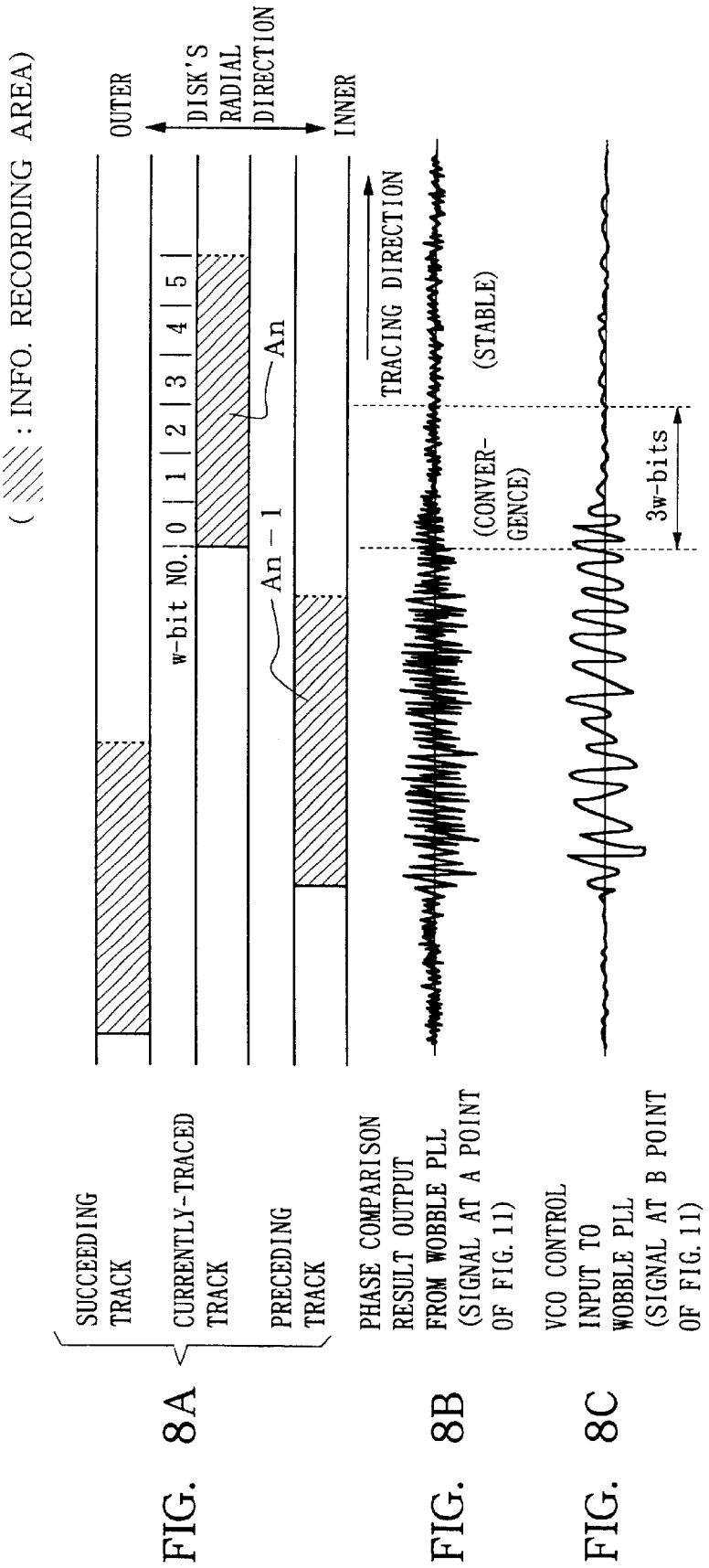
FIGS. 8(a)–8(c) are diagrams showing $0^{th}$–$2^{nd}$ w-bits of FIG. 7, which shows influences exerted on a wobble PLL when a track adjoining a currently-traced track has the information recording area at a position immediately before the start point of the information recording area of the current track.

Specifically, FIGS. 7(a) and 7(b) show the track wobble recorded in the leading or first information recording area of one of the sectors; more specifically, FIG. 7(a) shows a case where the information recording area is in an even-numbered sync frame while FIG. 7(b) shows a case where the information recording area is in an odd-numbered sync frame. Further, FIGS. 7(c) and 7(d) in FIG. 7 show the track wobble recorded in the second or subsequent information recording area of the sector, which includes address information elements.

The information recording area is made up of the $0^{th}$ to $5^{th}$ w-bits, and in the $0^{th}$ to $3^{rd}$ w-bits out of these five w-bits, there is recorded an information recording area synchronization signal that is composed of a code "0001". The reason why the leading $0^{th}$ to $2^{nd}$ w-bits are "000" (i.e., non-modulated) is that if any information recording area An−1 exists in an adjoining track n−1 at a position immediately before the start point of an information recording area An of a currently-traced track n, jitters of a wobble PLL (Phase-Locked Loop), caused by cross-talk by the adjoining track n−1 during the tracing of the position immediately before the start point of the information recording area An, would remain due to a delayed response even after the information recording area An starts. Namely, with a view to eliminating the jitters of the wobble PLL, the non-modulated region is provided across the leading $0^{th}$ to $2^{nd}$ w-bits of the information recording area.

Further, at the fourth w-bit of the information recording area in FIGS. 7(a)–7(d), a code "1" is recorded as a leading-information-recording-area syncronization signal to identify the leading information recording area within the sector (medium-size section); however, a code "0" is recorded as a syncronization signal to identify information recording areas other than the leading one (i.e., non-leading information recording areas) within the sector.

At the fifth w-bit of the information recording area in FIGS. 7(a)–7(d), there is recorded information that differs depending on the code of the fourth w-bit. Namely, when the code of the fourth w-bit is "1" that is indicative of the leading information recording area, information (even-number/odd-number identifying information) is recorded at the fifth w-bit which indicates whether the information recording areas are each set in an odd-numbered sync frame or in an even-numbered sync frame of the sector. More specifically, if the code recording at the fifth w-bit is "1", it means that all the information recording areas of the sector are set in the even-numbered sync frames, but if the code recording at the fifth w-bit is "0", it means that all the information recording areas of the sector are set in the odd-numbered sync frames.

When the code of the fourth w-bit is "0" that is indicative of one of the non-leading information recording areas, on the other hand, there is recorded, at the fifth w-bit, data of a bit of the address information at the corresponding position as an address information element. Namely, a code "1" recorded at the fifth w-bit indicates that the data value of the address information element is "1" while a code "0" recorded at the fifth w-bit indicates that the data value of the address information element is "0". Particular bit in a bit stream constituting the address information, which corresponds to the address information element, can be identified by ascertaining from which one of the sectors as counted from the start point of the ECC block and which one of the sync frames as counted from the start point of that sector the address information element has been read out.

Figure 9:
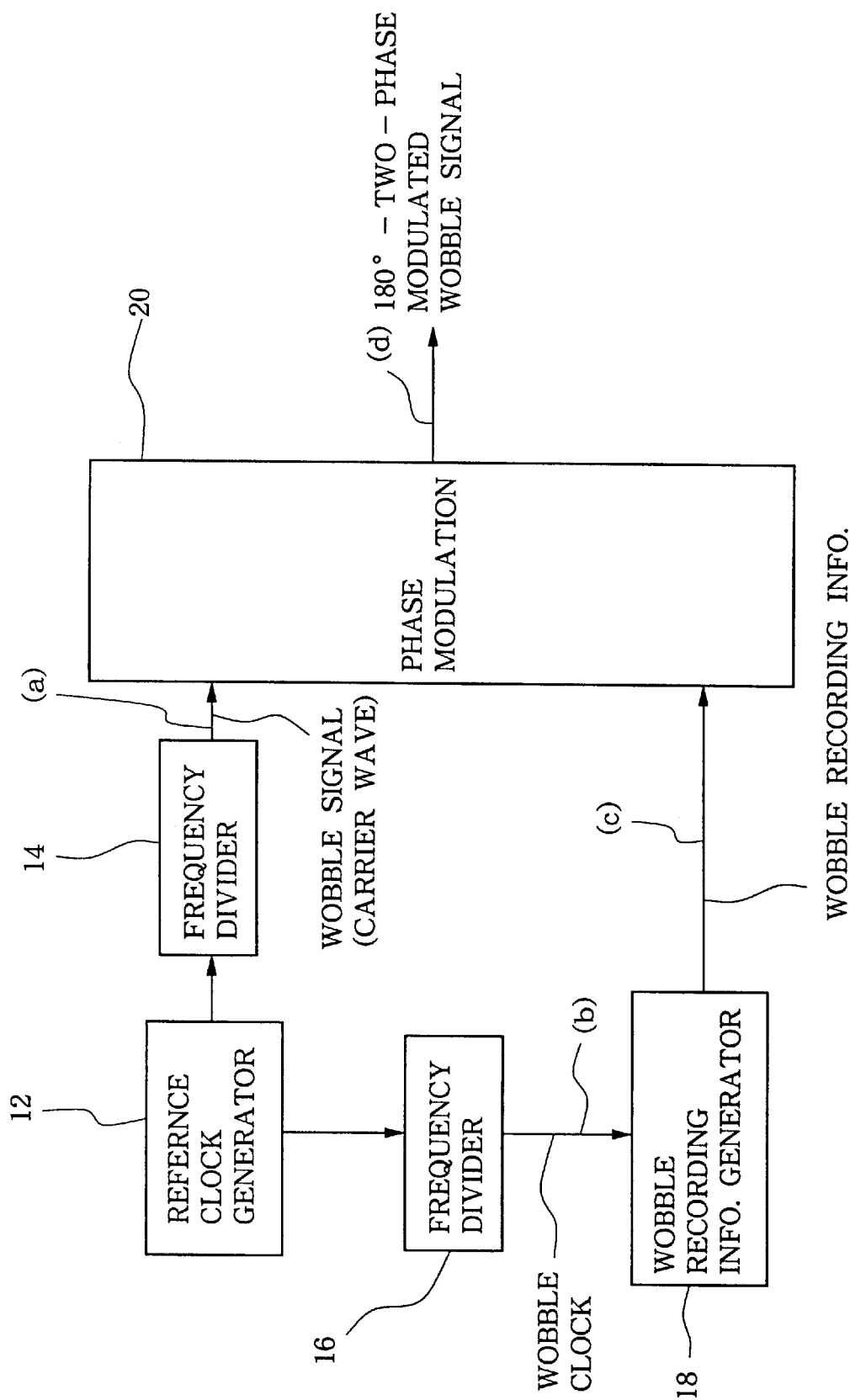
FIG. 9 is a block diagram of wobble signal generation circuitry that is employed in an apparatus for recording wobbling tracks in a master of the inventive optical disk.
Figure 10:
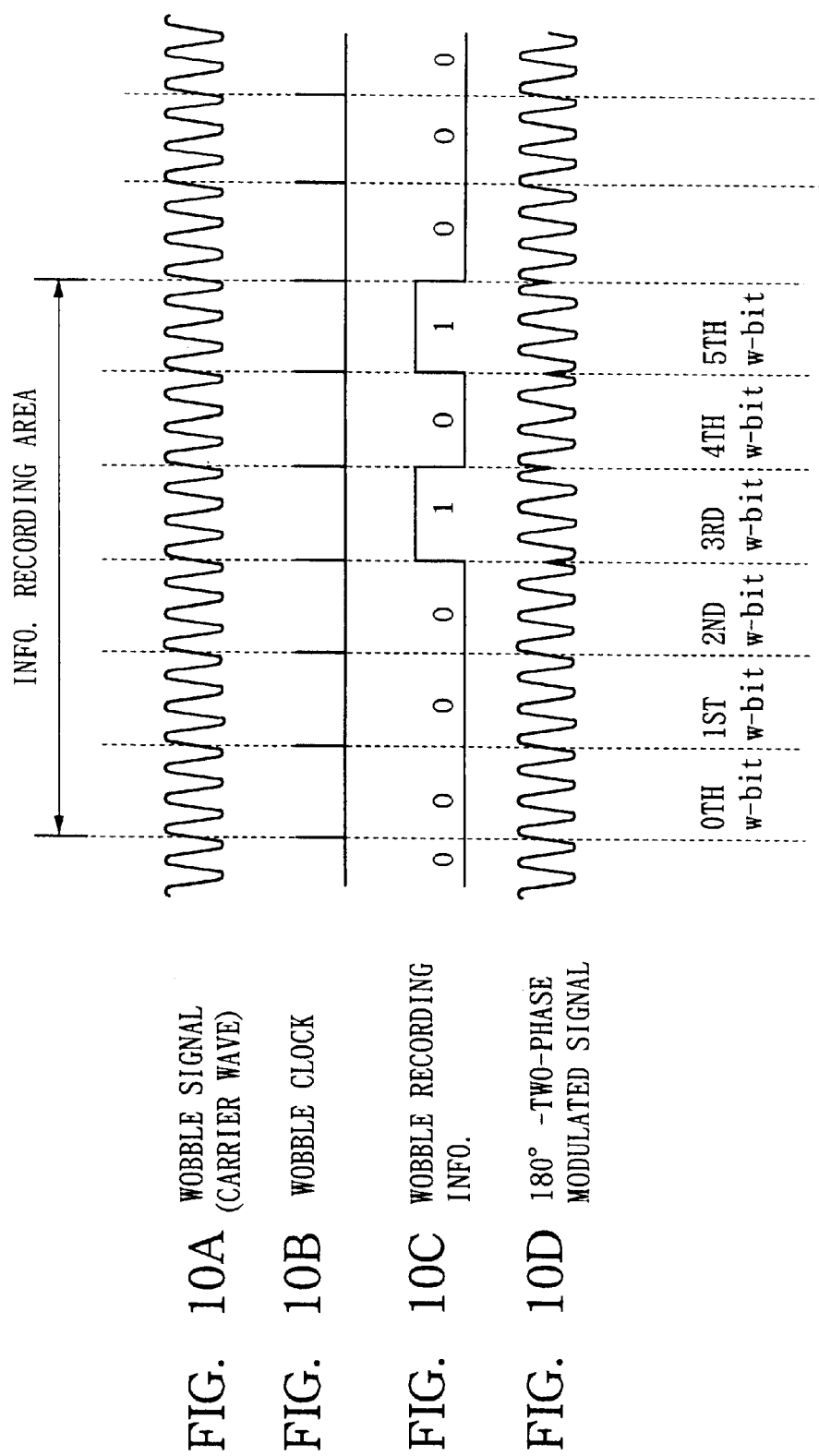
FIGS. 10(a)–10(d) are diagrams showing waveforms output from various components of FIG. 9.

FIG. 9 is a block diagram of wobble signal generation circuitry that is employed in a master recording apparatus for manufacturing the optical disk 10 of FIG. 1A and is constructed to record wobbling tracks as shown in FIGS. 7(a)–7(d). Further, FIGS. 10(a)–10(d) show waveforms output from various components of FIG. 9. In FIG. 9, a reference clock generator circuit 12 includes generates reference clock pulses using a quartz oscillator. Each of the reference clock pulses generated by the clock generator circuit 12 is given to a frequency divider 14, so to generate a wobble signal (carrier wave signal) at a predetermined frequency (e.g., 140 kHz) as illustrated in FIG. 10(a). Each of the reference clock pulses is also given to another frequency divider 16, so as to generate a wobble clock pulse at a frequency three times as low as the wobble signal as illustrated in FIG. 10(b). Wobble recording information generator circuit 18 generates wobble recording information in synchronism with the wobble clock pulse as illustrated in FIG. 10(c). Phase modulation circuit 20 performs 180°-two-phase modulation on the wobble signal in accordance with the wobble recording information, to thereby generate a 180°-two-phase-modulated wobble signal as illustrated in FIG. 10(d); that is, this phase modulation circuit 20 inverts the wobble signal when the wobble recording information is of the value "1", but does not invert the wobble signal when the wobble recording information is of the value "0". Thus, in the master disk is recorded a track wobbling in accordance with the waveform of the 180°-two-phase-modulated wobble signal.

Figure 4:
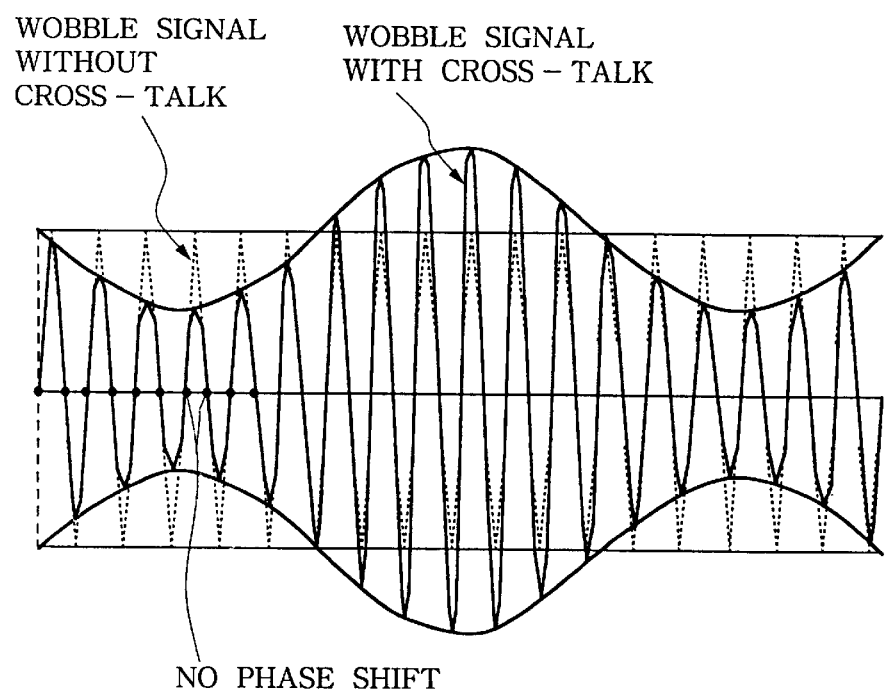
FIG. 4 is a waveform diagram of the push-pull detection signal generated during recording/reproduction on the CLV disk having track wobbles formed therein under the setting of FIG. 3.
Figure 11:
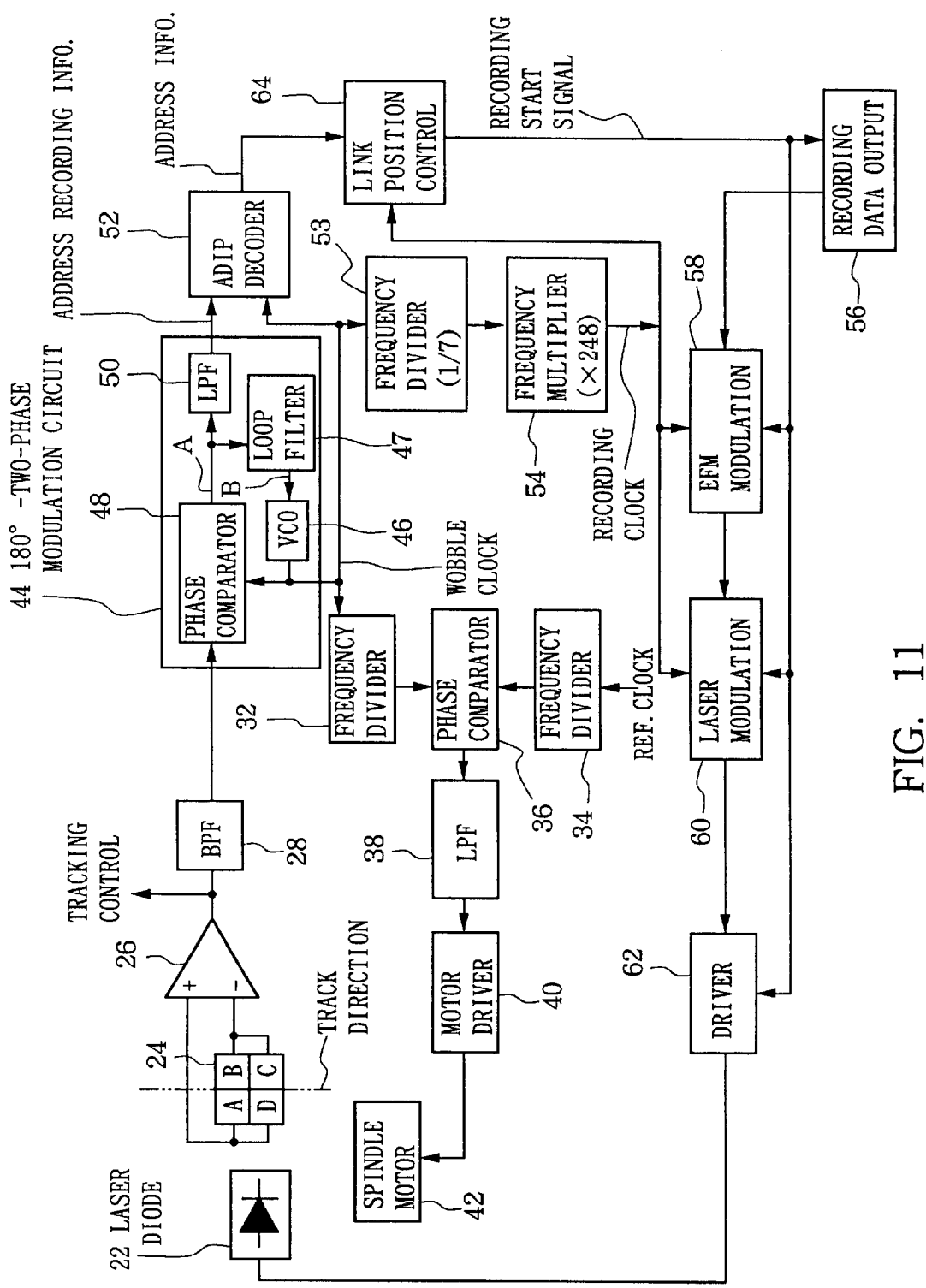
FIG. 11 is a block diagram showing an exemplary setup of an optical disk recording apparatus in accordance with an embodiment of the present invention.

FIG. 11 is a block diagram showing an exemplary setup of an optical disk recording apparatus for recording desired information onto the optical disk 10 of FIG. 1(a) where the grooves are formed in the above-mentioned manner. Laser diode 22 emits and irradiates a recording/reproducing laser light beam onto the recording surface of the optical disk 10 for recording or reproduction of desired information to or from the disk 10. At that time, a reflection of the laser light beam from the optical disk 10 is received by a four-quadrant or four-part photodetector 24, which produces four light reception signals via the respective quadrants. The light reception signals from one pair of the quadrants A and D adjoining each other along a longitudinal direction of the track are added together, and similarly the light reception signals from another pair of the quadrants B and C adjoining each other along the direction of the track are added together, and a subtracter 26 performs subtraction the resultant sums of the quadrant pairs, i.e., "(A+D)−(B+C)", so that a push-pull signal as shown in FIG. 4 is provided. Tracking servo control is performed on the basis of the push-pull signal.

Further, the push-pull signal is passed through a band-pass filter 28 to extract a wobble signal component. The thus-extracted wobble signal component is sent to a 180°-two-phase demodulation circuit 44 constituting a wobble PLL. Namely, a phase comparator 48 in the 180°-two-phase demodulation circuit 44 compares the phases of the extracted wobble signal and an output signal from a VCO (Voltage-Controlled Oscillator) 46, and generates a signal corresponding to the phase difference between the two signals. The output signal from the phase comparator 48, indicative of the phase difference between the extracted wobble signal and the VCO output signal, is averaged via a loop filter 47, to control the frequency and phase of the VCO 46. Because most of the wobble signal is recorded in non-inverted form, the phase of the output signal from the VCO 46 is synchronized with that of the non-inverted wobble signal. Thus, the phase comparator 48 produces phase comparison outputs that increase in level in response to a region where the wobble signal is recorded in phase-inverted form (i.e., in response to a region where the code of the wobble recording information is "1" as illustrated in FIG. 10(c). Therefore, a demodulated signal of the wobble recording information can be provided by passing the output signal from the phase comparator 48 through a low-pass filter 50 to eliminate ripples corresponding to the wobble frequency.

ADIP (Address In-Pregroove) decoder (address information demodulator) circuit 52 demodulates the wobble recording information by sampling the demodulated signal of the wobble recording information in accordance with the output signals from the VCO 46 (wobble clock pulses) and collects the address information elements dispersedly recorded within the ECC block, to thereby acquire the address information indicative of the position of the ECC block.

Wobble clock pulse output from the VCO 46 is passed to a frequency divider 53 for frequency division by a factor of seven and then multiplied by 248 via a frequency multiplier 54, so as to generate a recording clock of a channel bit period (i.e., one sync frame=42 wobble waves=1488 channel bits).

Further, a link position control circuit (recording position control circuit) 64 detects a data-write link position on the basis of the address information output from the ADIP decoder circuit 52 and generates a start signal at a predetermined link position (at the start position of the ECC block), so that a data-write linking can be effected in response to the start signal. Namely, in response to the start signal, a recording data output circuit 56 outputs recording data, and an EFM modulation circuit 58 performs EFM (Eight-to-Fourteen Modulation) operations on the recording data in synchronism with recording reference clock pulses. Further, a laser modulation circuit 60 performs modulations to adjust the length, timing and level of a laser drive signal in accordance with time lengths of the level "1" and "0" regions of the laser drive signal. Then, a driver 62 drives the laser diode 22 in accordance with the thus-modulated laser drive signal so that desired information can be recorded onto the optical disk 10.

Rotation of a spindle motor 42 is controlled on the basis of the wobble clock pulses output from the VCO 46. More specifically, each of the wobble clock pulses from the VCO 46 is frequency-divided via a frequency divider 32, while each of the reference clock pulses generated by the quartz oscillator is frequency-divided via another frequency divider 34. Phase comparator 36 makes a comparison between the phases of the two clock pulses from the frequency dividers 32 and 34, and the output from the comparator 36 is smoothed via a low-pass filter 38, in accordance with which the spindle motor 42 is controlled, via a motor driver 40, to rotate at a constant linear velocity.

The preferred embodiment has been described above as allotting one address to each ECC block and one-bit address information element to each information recording area. The following paragraphs describe arrangements to allot individual addresses to all areas of the optical disk at the above-mentioned rate of allotment.

As seen in FIGS. 5(a)–5(d), each of the ECC blocks comprises 16 sectors, and each of the sectors comprises 26 sync frames. The information recording areas are set in half of the 26 sync frames, i.e., 13 sync frames, respectively, and the address information elements can be allotted to twelve of these 13 sync frames, one-bit address information element per sync frame; note that the value "1" at the fifth w-bit of the syncronization signal indicative of the sector's leading information recording area FIG. 7(a) is allotted to the remaining one information recording area. Therefore, a total of 192 (16×12) bits of the address information elements can be allotted to each of the ECC blocks. In the case of the DVD (Digital Versatile Disk), each of the ECC block can be identified by an address of only 20 bits, even though the DVD has two recording layers in each of the two surfaces (i.e., four recording layers in total); each of the ECC block has a storage capacity of 32 Kbytes (2 Kbytes/sector×16 sectors). Namely, only 20 bits out of the reserved 192 bits are sufficient to constitute the address information, which means that the 192 bits are quite enough even when parity check bits are taken into account.

Note that various form of address information allotment other than the above-mentioned is also possible in the present invention. For example, the address information may be allotted to every half of the ECC block. In this case, the number of the addresses doubles if the above-mentioned conditions are to be satisfied, and the necessary number of bits for the address information becomes 21. On the other hand, the total number of the address information elements that can be allotted to each half of the ECC block decreases in half to 96 bits. However, because only 21 bits out of the reserved 96 bits are sufficient to constitute the address information, which means that the 96 bits are still quite enough even when parity check bits are taken into account. Furthermore, the address information may be allotted every quarter of the ECC block. In this case, if the above-mentioned conditions are to be satisfied, the number of the addresses increases four times as compared to the case where one address is allotted per ECC block, and the necessary number of bits for the address information becomes 22. On the other hand, the total number of the address information elements that can be allotted to each quarter of the ECC block decreases in quarter to 48 bits. However, because only 22 bits out of the reserved 48 bits are sufficient to constitute the address information, which means that the 48 bits are still enough even when parity check bits are taken into account.

Further, whereas the preferred embodiment has been described above as allotting the one-bit address information element to each of the information recording areas, the present invention is not so limited; for example, address information element of a plurality of bits may be allotted to each of the information recording areas.

Figure 5:
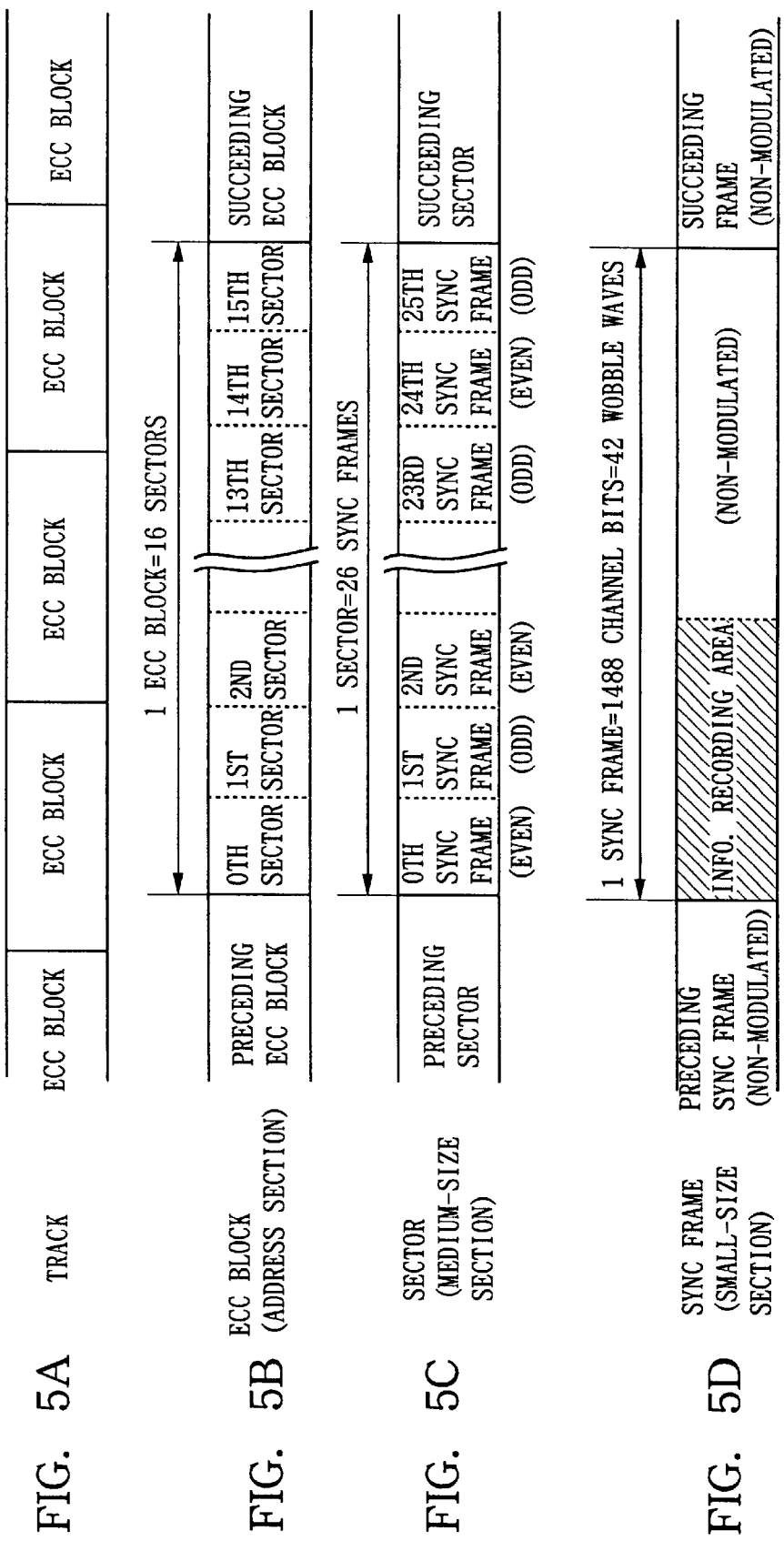
FIGS. 5A–5D are diagrams showing a format of wobble recording information to be recorded in the wobbles of the optical disk of FIG. 1.
Figure 12:
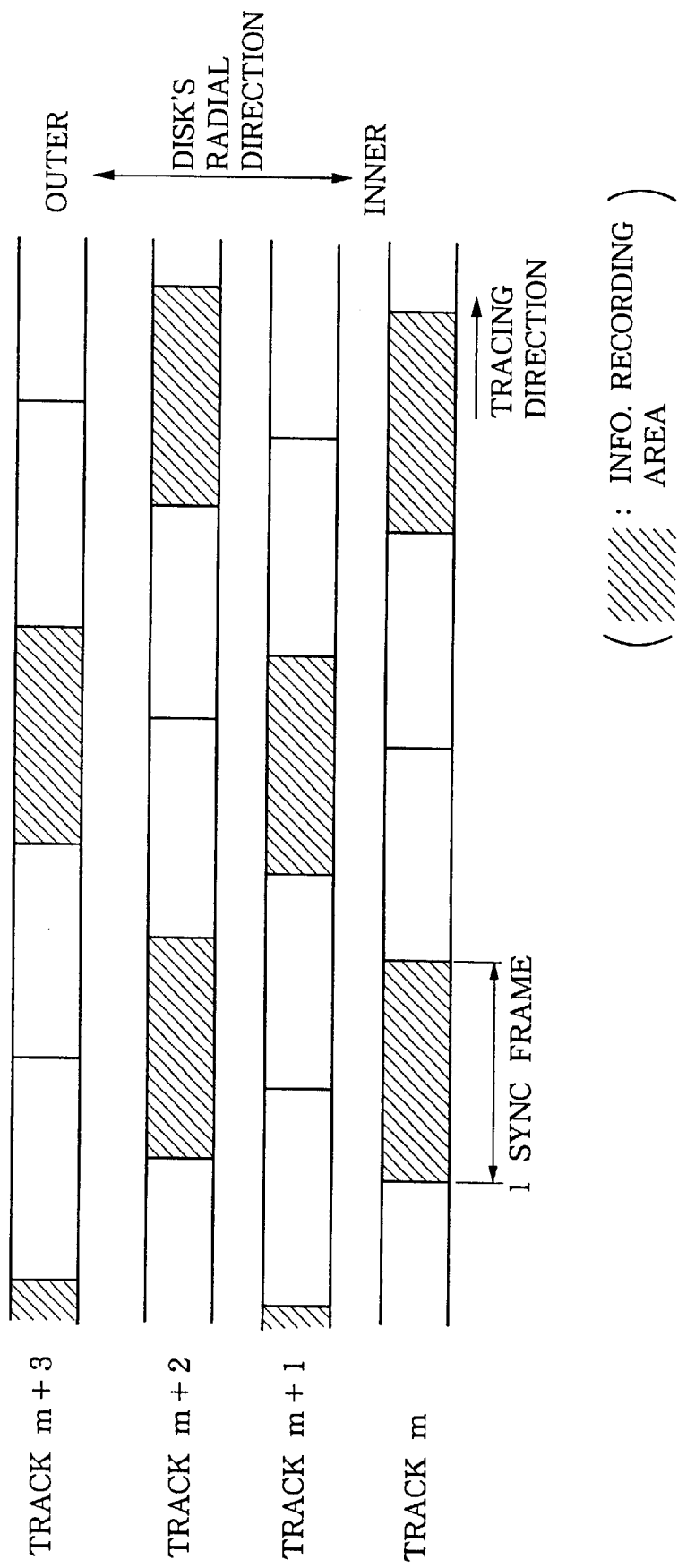
FIG. 12 is a diagram showing an optical disk in accordance with another embodiment of the present invention and particularly showing an exemplary manner in which track wobbles are recorded in the information recording area of a plurality of the tracks in a particular portion of the optical disk of FIG. 1.

Described below is a recordable optical disk in accordance with another embodiment of the present invention. In this recordable optical disk, a plurality of tracks are formed such that "$2\pi Tp/\lambda$" substantially equals an even-number multiple of 0.5, where Tp represents the track pitch and $\lambda$ represents the wavelength of the track wobbles. One address section is defined by each of the ECC blocks, and each piece of address information to be recorded in one of the address sections is divided into a plurality of address information elements. Each of the address information elements is set to or allotted to a predetermined position in a sync frame within the corresponding address section where there occurs no overlap in the information recording area, in the radial direction of the optical disk, with an adjoining track. The wobble in each of the sync frames where the address information element is allotted is recorded with 180°-two-phase modulation performed thereon in accordance with the address information element, with the wobbles in the other sync frames being recorded in non-modulated form. FIG. 12 is explanatory of an exemplary manner in which the information recorded areas are set in a plurality of the tracks in a given portion of the optical disk 10 to which the present invention is applied. In FIG. 12, illustration of the wobble waves is omitted for simplicity and each of the information recording areas is shown by hatching; let it also be assumed that there are no boundaries between the sectors in the illustrated range. In the illustrated example of FIG. 12, the entire length of each sync frame is provided as the information recording area, and wobble recording information is in the same format as shown in FIGS. 5(*a*)–5(*d*), except that the information recording area is set throughout the length of the sync frame. Further, the illustrated example of FIG. 12 is characterized by providing the information recording area every three sync frames, so that in each region of the optical disk where there would occur overlap in the information recording area, in the radial direction of the disk, between adjoining tracks, the information recording areas of these adjoining tracks are displaced in position from each other by the length of one sync frame to thereby avoid such overlap. Note that the information recording area may be set within a range smaller than the length of the sync frame.

What is claimed is:

1. A CLV-type recordable optical disk including a plurality of tracks, wherein
   the tracks are formed with $2\pi Tp/\lambda$ substantially equal to an even-number multiple of 0.5, where Tp is a track pitch and $\lambda$ is a wavelength of a track wobble,
   each of the tracks is divided into a plurality of address sections each including a first predetermined number of wobble waves, and each of the address sections is divided into a plurality of small-size sections each including a second predetermined number of the wobble waves,
   an information recording area having a length smaller than a half of a length of the small-size section is set, for each of the tracks, in each particular one of the small-size sections of the track located where there occurs no overlap in the information recording area, in a radial direction of the optical disk, between the track and tracks adjoining the track,
   one piece of address information for each of the address sections is divided into a plurality of address information elements that are allotted to respective ones of the information recording areas within the address section, and
   the track wobble at a predetermined position within each of the information recording areas having the address information elements allotted thereto is recorded with 180°-two-phase modulation performed thereon in accordance with the allotted address information, the track wobble in non-information recording areas being recorded in non-modulated form.

2. A CLV-type recordable optical disk as claimed in claim 1 wherein the information recording area is set primarily in even numbered sections of or odd numbered sections of said small-size section of each of the tracks, and in each portion of the optical disk where there would occur overlap in the information recording area, in the radial direction of the optical disk, between the track and tracks adjoining the track, the information recording areas of the tracks are displaced in position from each other by a length of one said small-size section to thereby avoid the overlap.

3. A CLV-type recordable optical disk as claimed in claim 1 wherein the information recording area is set in a start position of the small-size section, and an information recording area synchronization signal produced by recording the track wobble successively for a predetermined period in non-modulated and 180°-inverted form is recorded at a head of the information recording area.

4. A CLV-type recordable optical disk as claimed in claim 1 wherein each of the small-size sections corresponds to a sync frame in a DVD standard and a total number of the wobble waves within the sync frame is set to 42, and wherein the sync frame and the track wobble are synchronous in phase with each other so that the track wobble is set to a 0° phase at a start point of the sync frame.

5. A CLV-type recordable optical disk including a plurality of tracks, wherein
   the tracks are formed with $2\pi Tp/\lambda$ substantially equal to an even-number multiple of 0.5, where Tp is a track pitch and $\lambda$ is a wavelength of a track wobble,
   each of the tracks is divided into a plurality of address sections each including a first predetermined number of wobble waves, and each of the address sections is divided into a plurality of medium-size sections each including a second predetermined number of the wobble waves, each of the medium-size sections being divided into a plurality of small-size sections each including a third predetermined number of the wobble waves,
   an information recording area having a length smaller than a half of a length of the small-size section is set, for each of the tracks, in each particular one of the small-size sections located where there occurs no overlap in the information recording area, in a radial direction of the optical disk, between the track and tracks adjoining the track,
   a leading-information-recording-area synchronization signal is allotted to a leading one of the information recording areas in each of the medium-size sections, to identify the leading information recording area in the medium-size section, one piece of address information for each of the address sections is divided into a plurality of address information elements that are allotted to respective ones of the information recording areas within the address section, but not for the leading information recording area, where the leading-information-recording-area synchronization signal is not allotted, and the track wobble at a predetermined position in the leading information recording area of each of the medium-size sections where the leading-information-recording-area synchronization signal is allotted is recorded with 180°-two-phase modulation performed thereon in accordance with the allotted leading-information-recording-area synchronization signal, the track wobble at a predetermined position in each of the other information recording areas where the address information elements are allotted is recorded with 180°-two-phase modulation performed thereon in accordance with the allotted address information element, and the track wobbles in remaining areas are recorded in non-modulated form.

6. A CLV-type recordable optical disk as claimed in claim 5, wherein the information recording area is set primarily in even numbered sections of or odd numbered sections of said small-size section of each of the tracks, and in each portion of the optical disk where there would occur overlap in the information recording area, in the radial direction of the optical disk, between the track and tracks adjoining the track, the information recording areas of the tracks are displaced in position from each other by a length of one said small-size section to thereby avoid the overlap.

7. A CLV-type recordable optical disk as claimed in claim 5, wherein the information recording area is set primarily in even numbered sections of or odd numbered sections of said small-size section of each of the tracks, and in each portion of the optical disk where there would occur overlap in the information recording area, in the radial direction of the optical disk, between the track and tracks adjoining the track, the information recording areas of the tracks are displaced in position from each other by a length of one said small-size section to thereby avoid the overlap, and wherein the information recording area is set only in each of even-numbered small-size sections or in each of odd-numbered small-size sections within each of the medium-size sections, an identifying signal that identifies an even or odd number is allotted to the leading information recording area in each of the medium-size sections in order to indicate whether the information recording area is set only in each of the even-numbered small-size sections or in each of the odd-numbered small-size sections within each of the medium-size sections, and the track wobble at a predetermined position within each of the information recording areas is recorded with 180°-two-phase modulation performed thereon in accordance with the allotted identifying signal.

8. A CLV-type recordable optical disk as claimed in claim 5 wherein the information recording area is set in a start position of the small-size section, and an information recording area synchronization signal produced by recording the track wobble successively for a predetermined period in non-modulated and 180°-inverted form is recorded at a head of the information recording area.

9. A CLV-type recordable optical disk as claimed in claim 5 wherein each of the small-size sections corresponds to a sync frame in a DVD standard and a total number of the wobble waves within the sync frame is set to 42, and wherein the sync frame and the track wobble are synchronous in phase with each other so that the track wobble is set to a 0° phase at a start point of the sync frame.

10. An optical disk recording apparatus for recording desired information onto a CLV-type recordable optical disk, said CLV-type recordable optical disk including a plurality of tracks, the tracks being formed with $2\pi Tp/\lambda$ substantially equal to an even-number multiple of 0.5, where Tp is a track pitch and $\lambda$ is a wavelength of a track wobble, each of the tracks being divided into a plurality of address sections each including a first predetermined number of wobble waves, each of the address sections being divided into a plurality of small-size sections each including a second predetermined number of the wobble waves, an information recording area having a length smaller than a half of a length of the small-size section being set, for each of the tracks, in each particular one of the small-size sections located where there occurs no overlap in the information recording area, in a radial direction of the optical disk, between the track and tracks adjoining the track, one piece of address information for each of the address sections being divided into a plurality of address information elements that are allotted to respective ones of the information recording areas within the address section, the track wobble at a predetermined position within each of the information recording areas being recorded with 180°-two-phase modulation performed thereon in accordance with the allotted address information element, the track wobble in non-information recording areas being recorded in non-modulated form, said optical disk recording apparatus comprising:

a 180°-two-phase demodulation circuit that performs 180°-two-phase demodulation on a wobble signal detected from the optical disk to thereby demodulate information recorded in the information recording areas;

an address information demodulation circuit that, on the basis of the information demodulated by said 180°-two-phase demodulation circuit, demodulates the address information recorded dispersedly in the small-size sections of each of the address sections; and a recording position control circuit that performs recording position control on the basis of the address information demodulated by said address information demodulation circuit.

11. A method for recording desired information onto a CLV-type recordable optical disk comprising steps of:

preparing a CLV—type recordable optical disk including a plurality of tracks, the tracks being formed with $2\pi Tp/\lambda$ substantially equal to an even-number multiple of 0.5, where Tp is a track pitch and $\lambda$ is a wavelength of a track wobble, each of the tracks being divided into a plurality of address sections each including a first predetermined number of wobble waves, each of the address sections being divided into a plurality of small-size sections each including a second predetermined number of the wobble waves, an information recording area having a length smaller than a half of a length of the small-size section being set, for each of the tracks, in each particular one of the small-size sections located where there occurs no overlap in the information recording area, in a radial direction of the optical disk, between the track and adjoining the track, one piece of address information for each of the address sections being divided into a plurality of address information elements that are allotted to respective ones of the information recording areas within the address section, the track wobble at a predetermined position within each of the information recording areas being recorded with 180°-two-phase modulation performed thereon in accordance with the allotted address information element, the track wobble in non-information recording areas being recorded in non-modulated form, performing 180°-two-phase demodulation on a wobble signal detected from the optical disk to thereby demodulate information recorded in the information recording areas;

demodulating, on the basis of the information demodulated by said 180°-two-phase demodulation, the address information recorded dispersedly in the small-size sections of each of the address sections; and performing recording position control on the basis of the address information demodulated by said address information demodulation.

12. A CLV-type recordable optical disk including a plurality of tracks, where the tracks are formed with $2\pi Tp/\lambda$ substantially equals to an even number multiple of 0.5, where Tp is a track pitch and $\lambda$ is a wavelength of a track wobble, each of the tracks is divided into a plurality of address sections, a predetermined number of wobble waves in the track constituting an address section, the address section being divided into a plurality of small-size sections, one piece of address information to be recorded for each of the address sections of the track is divided into a plurality of address information elements that are allotted to respective ones of the small-size sections within the address section located in a position where there occurs no overlap in the information recording area, in a radial direction of the optical disk, between the track and tracks adjoining the particular track, and the track wobble in each of the small-size sections to which the address information element is allotted is recorded with 180° two-phase modulation performed thereon in accordance with the allotted address information element and the track wobble in the small size sections to which the address information element is not allotted is recorded in non-modulated form.

\* \* \* \* \*